United States Patent
Im et al.

(10) Patent No.: US 10,824,037 B2
(45) Date of Patent: Nov. 3, 2020

(54) ARRAY SUBSTRATE FOR LIQUID CRYSTAL DISPLAY DEVICE

(71) Applicant: LG DISPLAY CO., LTD., Seoul (KR)

(72) Inventors: Chul-Woo Im, Goyang-si (KR); Kwan Kim, Goyang-si (KR)

(73) Assignee: LG DISPLAY CO., LTD., Seoul (KR)

( * ) Notice: Subject to any disclaimer, the term of this patent is extended or adjusted under 35 U.S.C. 154(b) by 229 days.

(21) Appl. No.: 16/112,398

(22) Filed: Aug. 24, 2018

(65) Prior Publication Data

US 2019/0064622 A1 Feb. 28, 2019

(30) Foreign Application Priority Data

Aug. 25, 2017 (KR) ........................ 10-2017-0107741

(51) Int. Cl.
*G02F 1/1362* (2006.01)
*G02F 1/1345* (2006.01)
*G02F 1/1368* (2006.01)

(52) U.S. Cl.
CPC ...... *G02F 1/136286* (2013.01); *G02F 1/1345* (2013.01); *G02F 1/1368* (2013.01); *G02F 2001/13629* (2013.01); *G02F 2001/136295* (2013.01)

(58) Field of Classification Search
None
See application file for complete search history.

(56) References Cited

U.S. PATENT DOCUMENTS

| 5,652,633 | A | * | 7/1997 | Lee | .................. | G02F 1/136286 |
| | | | | | | 349/42 |
| 6,118,508 | A | * | 9/2000 | Park | .................. | G02F 1/134363 |
| | | | | | | 349/141 |
| 2009/0096975 | A1 | * | 4/2009 | Kwon | .................. | G02F 1/1345 |
| | | | | | | 349/139 |
| 2012/0113154 | A1 | * | 5/2012 | Ge | ...................... | G09G 3/3614 |
| | | | | | | 345/690 |

* cited by examiner

*Primary Examiner* — Bo B Jang
(74) *Attorney, Agent, or Firm* — Birch, Stewart, Kolasch & Birch, LLP

(57) ABSTRACT

An array substrate for a liquid crystal display device can include a plurality of gate lines arranged in one direction to correspond to an active area on a substrate; a plurality of data lines configured to cross the plurality of gate lines in a perpendicular direction; a plurality of pixel electrodes respectively positioned at intersections between the plurality of gate lines and the plurality of data lines; and a plurality of data link lines respectively connected to a $(4n-2)^{th}$ data line in the active area and a $(4n-2)^{th}$ data pad in the non-active area, and a $(4n-1)^{th}$ data line in the active area and a $(4n-1)^{th}$ data pad in the non-active area, where n is a natural number, in which at least some of the plurality of data link lines are located at a different layer level than the plurality of data lines.

18 Claims, 8 Drawing Sheets

FIG. 8

| EXPERIMENTAL MODEL | Flicker Ave. (30Hz. 127gray) | |
|---|---|---|
| | CONVENTIONAL STRUCTURE | STRUCTURE OF INVENTION |
| 5.1FHD | -61dB | -74dB |
| 5.7QHD+ | -47dB | -67dB |

ARRAY SUBSTRATE FOR LIQUID CRYSTAL DISPLAY DEVICE

CROSS REFERENCE TO RELATED APPLICATIONS

This application claims the benefit of Korean Patent Application No. 10-2017-0107741, filed in the Republic of Korea on Aug. 25, 2017, the entirety of which is hereby incorporated by reference as if fully set forth herein.

BACKGROUND OF THE INVENTION

Field of the Invention

The present invention relates to a liquid crystal display device, and more particularly, to an array substrate for a liquid crystal display device for enhancing a connection structure of data link lines to enhance flicker characteristics.

Discussion of the Background Art

In general, because a liquid crystal display device is a flat type display device that has excellent visibility compared to a display device that uses a cathode ray tube (CRT) and has low average power consumption compared with a CRT with an equivalent screen size and also has a small heating value. Recently, liquid crystal display devices have attracted attention as next generation display devices for a monitor of a portable phone, a computer, or a television (TV), along with plasma display devices or field emission display devices.

A liquid crystal display device is driven using a principle based on the optical anisotropy and polarizability of liquid crystal. Liquid crystal is structurally thin and long and has directional properties in molecule arrangement and, in this regard, an electric field is artificially applied to liquid crystal to control a direction of molecule arrangement.

Accordingly, when the direction of molecule arrangement of liquid crystal is arbitrarily adjusted, the molecule arrangement of liquid crystal is changed and light is refracted in the direction of the molecule arrangement of liquid crystal to represent image information based on the optical anisotropy of liquid crystal.

Hereinafter, a related-art liquid crystal display device is described with reference to the appended drawings.

FIG. 1 is a plan view of an array substrate for a related-art liquid crystal display device.

As shown, an array substrate 10 for the related-art liquid crystal display device is divided into an active area AA, in which an image is realized, and a non-active area NAA, in which an image is not realized.

In the active area AA on the substrate 10, first to $m^{th}$ gate lines GL1 to GLm for receiving a scan signal in one direction and first to $n^{th}$ data lines DL1 to DLn that perpendicularly cross the first to $m^{th}$ gate lines GL1 to GLm to define a plurality of pixel areas P and receive a data signal may be arranged in a matrix.

A plurality of thin film transistors T that function as a switch may be configured at intersections between the first to $m^{th}$ gate lines GL1 to GLm and the first to $n^{th}$ data lines DL1 to DLn according to a one-to-one correspondence and may contact pixel electrodes 80 that correspond to the pixel areas according to a one-to-one correspondence.

The first to $m^{th}$ gate lines GL1 to GLm and the first to $n^{th}$ data lines DL1 to DLn may be connected to first to $m^{th}$ gate pads GP1 to GPm and first to $n^{th}$ data pads DP1 to DPn, respectively, through first to $m^{th}$ gate link lines GLL1 to GLLm and first to $n^{th}$ data link lines DLL1 to DLLn, which correspond to the non-active area NAA.

In this instance, the first to $m^{th}$ gate pads GP1 to GPm and the first to $n^{th}$ data pads DP1 to DPn may respectively contact and correspond to first to $m^{th}$ gate pad electrodes and first to $n^{th}$ data pad electrodes, which are formed of the same material at the same layer level as the pixel electrodes 80, through first to $m^{th}$ gate pad contact holes and first to $n^{th}$ data pad contact holes, through which the first to $m^{th}$ gate pads GP1 to GPm and the first to $n^{th}$ data pads DP1 to DPn are exposed, respectively.

The first to $m^{th}$ gate pad electrodes and the first to $n^{th}$ data pad electrodes are attached to a gate and data driving circuit unit that is disposed at one side spaced apart from the substrate 10 via a tape automated bonding (TAB) installation process and, thus, transmits scan and data signals from the gate and data driving circuit unit to the first to $m^{th}$ gate lines GL1 to GLm and the first to $n^{th}$ data lines DL1 to DLn, respectively.

However, in the array substrate for a liquid crystal display device with the above configuration, first to $m^{th}$ gate lines, link lines, and pads, and first to $n^{th}$ data lines, link lines, and pads are configured in the same pattern at the same layer level and, thus, there is a limit in reducing and designing an area corresponding to a non-active area, which is described in detail with reference the appended drawings. For example, it is difficult to make the non-active area any smaller after a given point with the above configuration.

FIG. 2 is an enlarged view of a portion A of FIG. 1 in terms of a non-active area. In this instance, an odd numbered line is defined as ODD and an even numbered line is defined as EVEN.

As shown in FIG. 2, in the active area AA on the substrate 10, odd and even gate lines 20a and 20b may be configured in one direction, and odd and even data lines 30a and 30b may be configured in a perpendicular direction to cross the odd and even gate lines 20a and 20b.

In this instance, the plurality of thin film transistors T may be configured to correspond to intersections between the odd and even gate lines 20a and 20b and the odd and even data lines 30a and 30b and, thus, the plurality of thin film transistors T includes a gate electrode 25 that extends from the even gate lines 20b, a plurality of semiconductor layers positioned on the gate electrode 25, and a plurality of source and drain electrodes 32 and 34 that are spaced apart from each other on the plurality of semiconductor layers.

In this instance, the semiconductor layer includes an active layer 40 formed of deionized amorphous silicon (a-Si:H) and an ohmic contact layer formed of amorphous silicon (n+ a-Si:H) including impurities. In addition, the plurality of pixel electrodes 80 that contact the drain electrodes 34 through a drain contact hole CH1 with the drain electrodes 34 exposed therethrough may be configured to correspond to the pixel areas P according to a one-to-one correspondence.

In this instance, the pixel electrodes 80 may be configured with one selected from a group including transparent conductive metals, such as indium-tin-oxide (ITO) and/or indium-zinc-oxide (IZO).

In the non-active area NAA on the substrate 10, odd and even data link lines 50a and 50b and odd and even data pads 60a and 60b that extend from the odd and even data lines 30a and 30b are each configured. In this instance, the non-active area NAA is subdivided into a data link area DLA including the odd and even data link lines 50a and 50b and a data pad area DPA including the odd and even data pads 60a and 60b.

The odd and even data pads 60a and 60b respectively contact odd and even data pad electrodes 70a and 70b formed of the same material at the same layer level as the pixel electrodes 80 through odd and even data pad contact holes DPH1 and DPH2 through which the odd and even data pads 60a and 60b are partially exposed.

Here, the odd and even data lines 30a and 30b, the odd and even data link lines 50a and 50b, and the odd and even data pads 60a and 60b may be configured in the same pattern at the same layer level, respectively.

With regard to the array substrate 10 for a related-art liquid crystal display device with the above configuration, a method of reducing and designing an area of the odd and even data pads 60a and 60b to reduce and design an area corresponding to the non-active area NAA is proposed but, when the area of the odd and even data pads 60a and 60b is reduced and designed, there is a problem in terms of degraded image quality, such as an afterimage due to data signal delay along with increases in resistance. In addition, when a width CD of the odd and even data link lines 50a and 50b is reduced, there is concern of causing a signal delay due to an increase in line resistance and, thus, there is a limit to reducing the width CD of the odd and even data link lines 50a and 50b.

As an alternative thereto, a two-type metal data link structure shown in FIG. 3 is proposed. That is, the alternative can be a technology of forming alternately arranged first and second link lines on different layers. That is, the drawing illustrates the structure in which second link lines 202 are arranged on a second layer 102 on a first layer 101 and first link lines 201 are arranged on a third layer 103.

As such, the data link lines may be formed using two-type metal but not single-type metal and, thus, a size of a data link area may be reduced to realize a narrow bezel.

FIG. 4 is a diagram showing an example of an array substrate to which the two-type metal data link structure is applied. The data link structure may have a metal arrangement in which first metal, second metal, first metal, and second metal are repeatedly formed, in the stated order. The first metal is connected to data odd outputs D1, D3, and D5 to affect the characteristics of an odd pixel OP, and the second metal is connected to data even outputs D2, D4, and D6 to affect the characteristics of an even pixel EP. That is, the first metal and the second metal are regularly and repeatedly connected to the odd pixel OP and the even pixel EP. Due to this structure, a characteristic difference between odd and even pixels is caused. Accordingly, as shown in FIG. 5, a luminance-asymmetry phenomenon between driving frames is caused, degrading flicker characteristics.

SUMMARY OF THE INVENTION

An object of the present invention is to provide an array substrate for a liquid crystal display device for improving flicker characteristics using a new data link line connection structure.

Another object of the present invention is to provide an array substrate for a liquid crystal display device for improving flicker characteristics during driving at a low frequency.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with embodiments of the invention, as embodied and broadly described herein, an array substrate for a liquid crystal display device includes a plurality of gate lines arranged in one direction to correspond to an active area on a substrate, a data line configured to cross the plurality of gate lines in a perpendicular direction, a thin film transistor positioned at intersections between the plurality of gate lines and the data line, a pixel electrode connected to the thin film transistor, and a data link line configured by arranging metals of a $(4n-2)^{th}$ (n is a natural number) data line and a $(4n-1)^{th}$ data line in the active area and metals for connecting a $(4n-2)^{th}$ data pad and a $(4n-1)^{th}$ data pad in the non-active area at different layer levels.

The data link line can be configured using metals of a $(4n-2)^{th}$ (n is a natural number) data line and a $(4n-1)^{th}$ data line in the active area and metals for connecting a $(4n-2)^{th}$ data pad and a $(4n-1)^{th}$ data pad in the non-active area with different metals.

The data link line can be configured using metals of a $(4n-3)^{th}$ data line and a $4^{th}$ data line in the active area and metals for connecting a $(4n-2)^{th}$ data pad and a $(4n-1)^{th}$ data pad in the non-active area with the same material at the same layer level.

The data link line can be connected to the $(4n-3)^{th}$ data and the $4n^{th}$ data line in the active area, and the $(4n-2)^{th}$ data pad and the $(4n-1)^{th}$ data pad in the non-active area through contact holes, respectively.

The data link line can include a main data link area configured by sequentially and repeatedly arranging different metals, a data pad area positioned on the main link area and connected to a data pad, and a data bridge area positioned below the main link area and connected to a data line.

The data pad area and the data bridge area can include wirings configured by alternately arranging two metals to cross each other at different layer levels.

A $(4n-1)^{th}$ data link line and a $4n^{th}$ data link line in the data pad area and the data bridge area can be alternately configured at different layer levels.

The $(4n-1)^{th}$ data line in the active area can be connected to the data link line for connection with the $(4n-1)^{th}$ data pad in the non-active area through a contact hole.

The pixel electrode of the liquid crystal display device can be driven using a column inversion method.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain principles of the invention. In the drawings:

FIG. 8 is a diagram showing an example of experimental results when an array substrate according to an embodiment of the present invention is used compared with when an array substrate of a conventional structure is used.

DETAILED DESCRIPTION OF THE INVENTION

Figure 1:
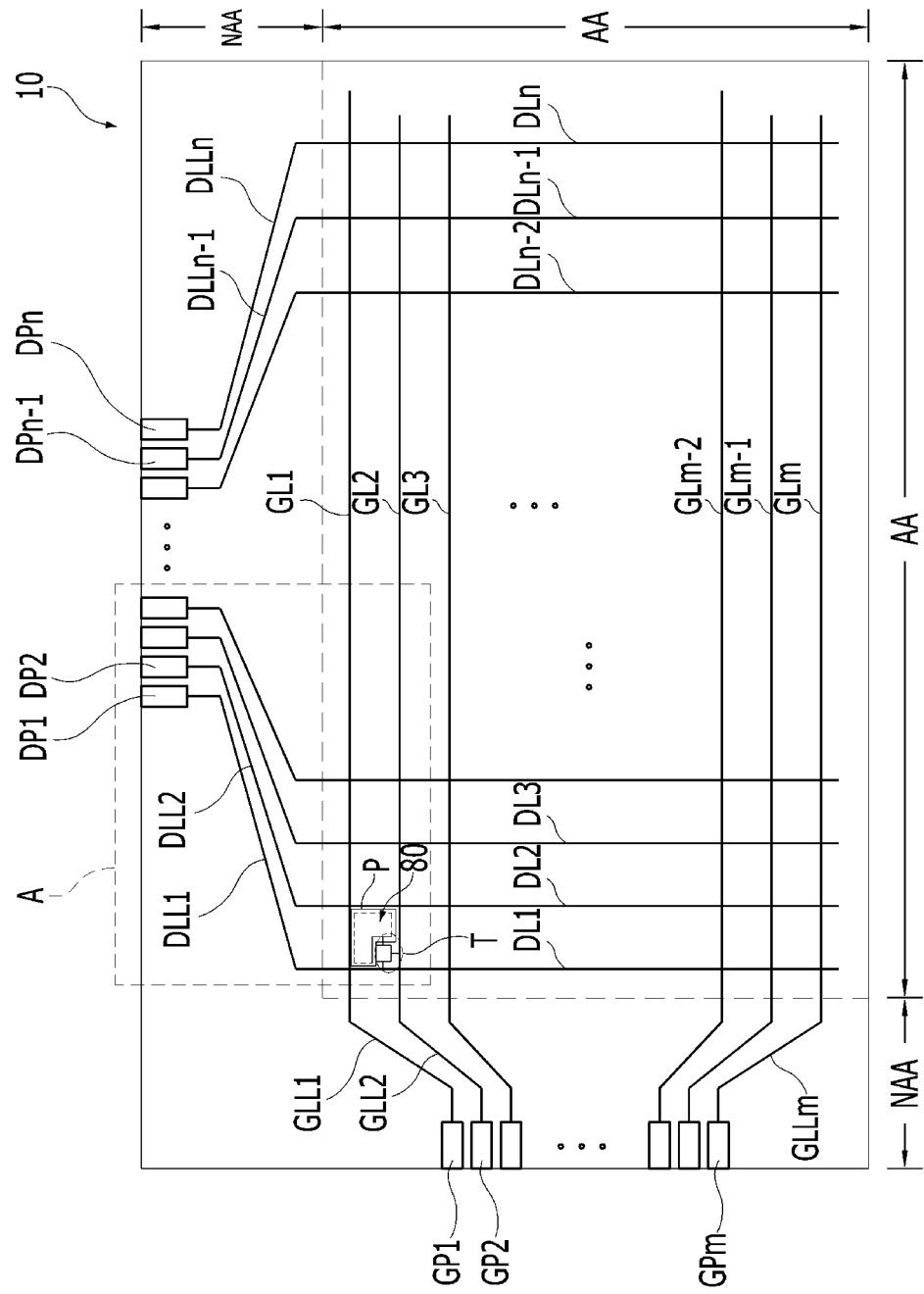
FIG. 1 is a plan view of an array substrate for a related-art liquid crystal display device.
Figure 2:
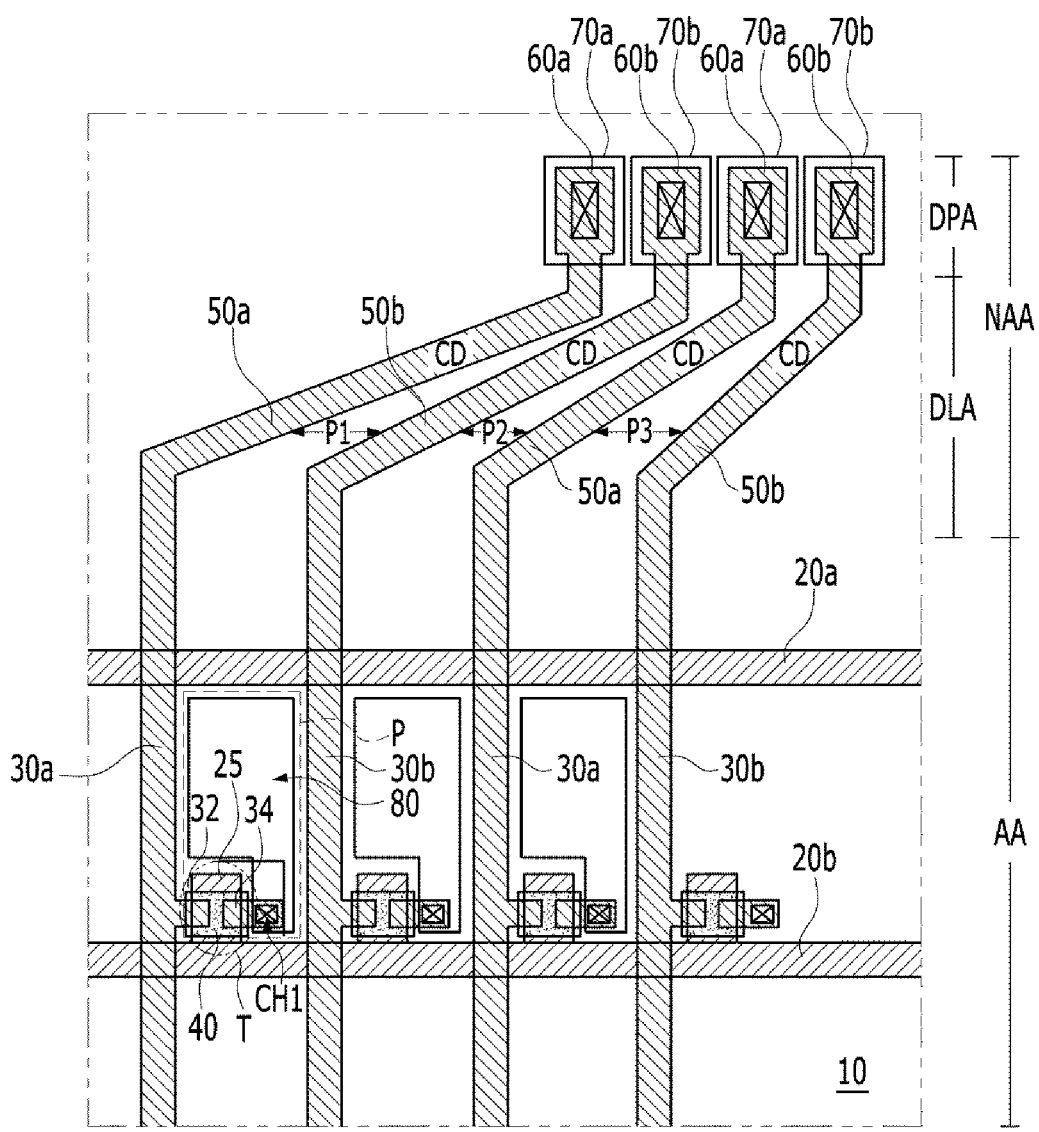
FIG. 2 is an enlarged view of portion A of FIG. 1.
Figure 3:
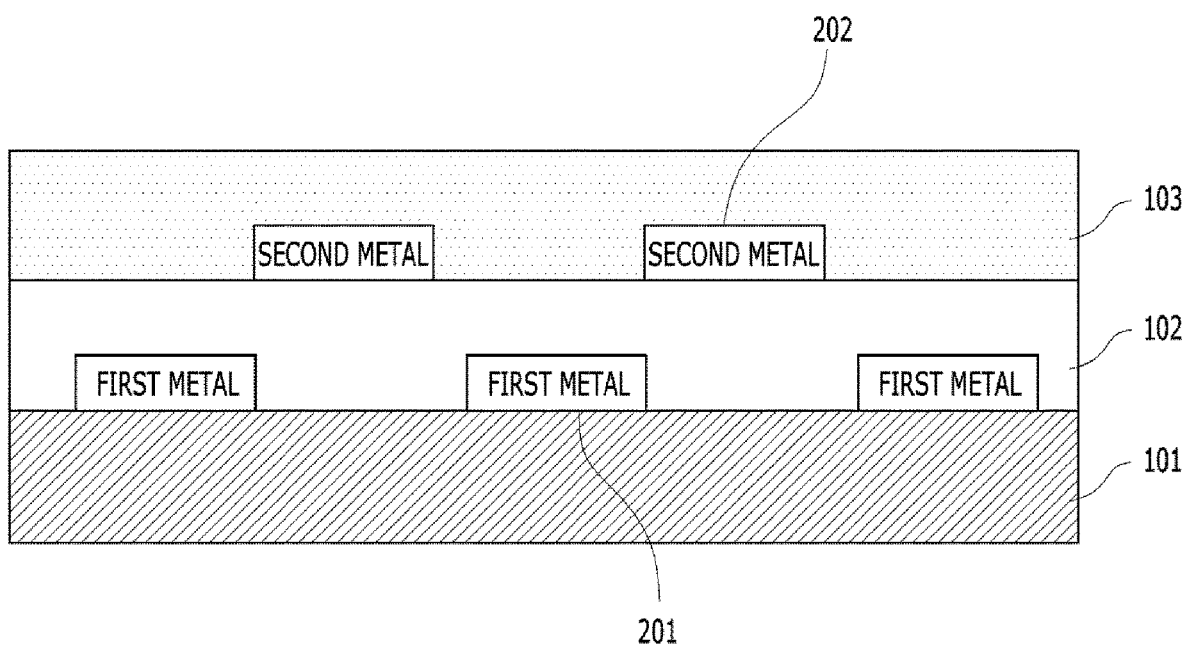
FIG. 3 is a diagram showing an example of a two-type metal data link structure.
Figure 4:
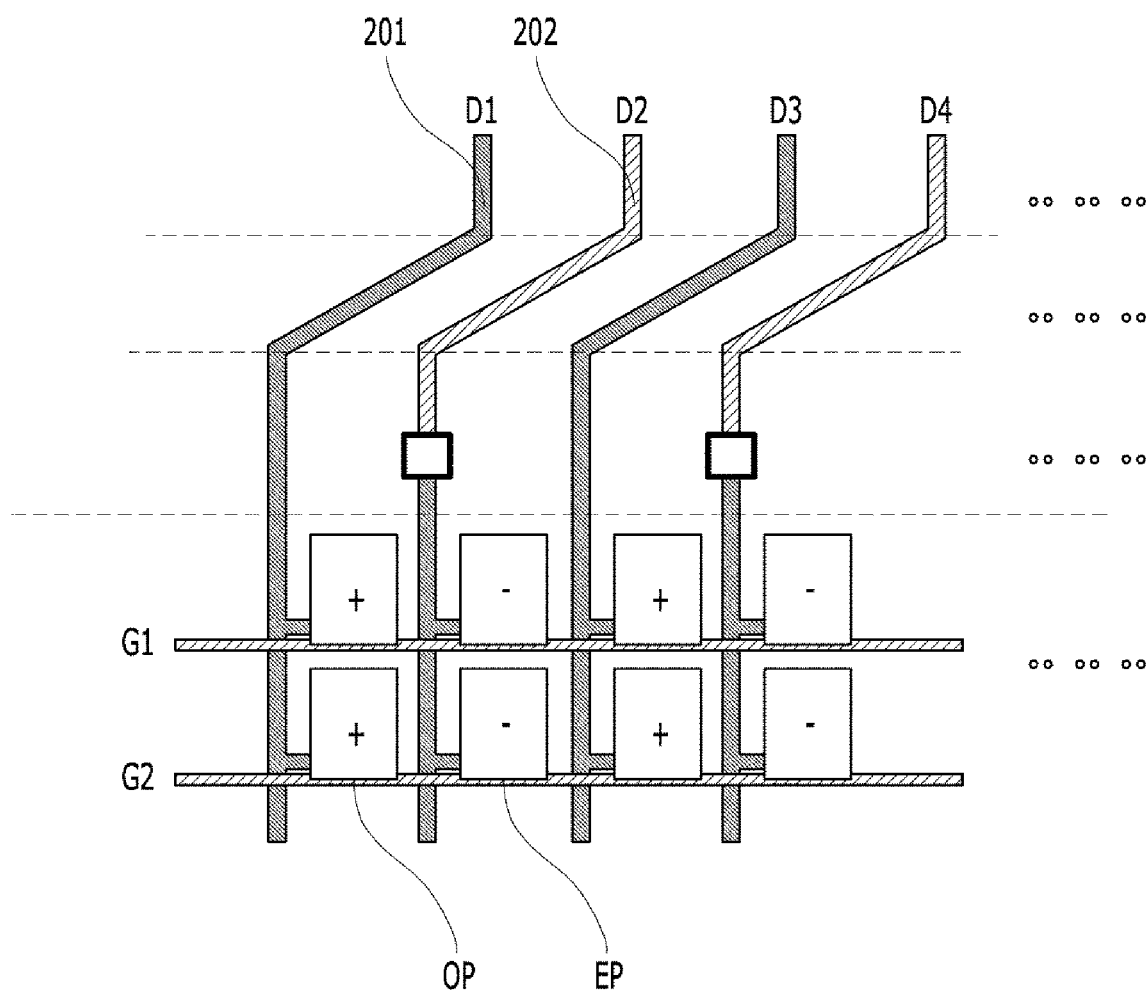
FIG. 4 is a diagram showing an example of an array substrate to which the two-type metal data link structure of FIG. 3 is applied.
Figure 5:
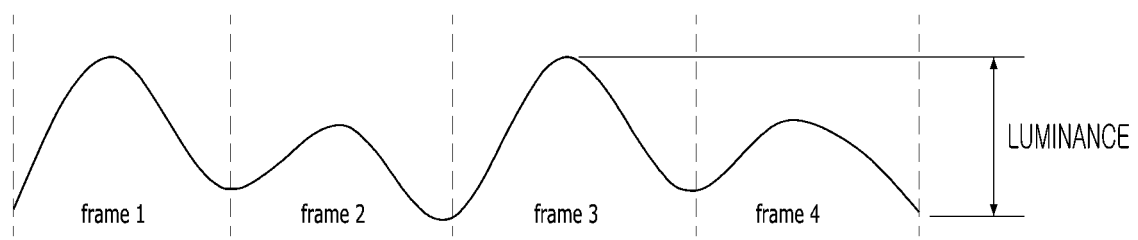
FIG. 5 is a diagram showing a luminance-asymmetry phenomenon between even and odd frames when a related-art array substrate is used.

In example embodiments of the present invention disclosed in the specification, specific structural and functional descriptions are merely illustrated for the purpose of illustrating embodiments of the invention and embodiments of the present invention can be embodied in many forms and are not limited to the embodiments set forth herein.

Example embodiments of the present invention can be variously changed and embodied in various forms, in which illustrative embodiments of the invention are shown. However, embodiments of the present invention should not be construed as being limited to the embodiments set forth herein and any changes, equivalents or alternatives which are within the spirit and scope of the present invention should be understood as falling within the scope of the invention Although the terms first, second, third etc. may be used herein to describe various elements, these elements should not be limited by these terms. These terms are only used to distinguish one element from another element. For example, a first element may be termed a second element and a second element may be termed a first element without departing from the teachings of the present invention.

When an element, such as a layer, a region, or a substrate, is referred to as being "on," "connected to" or "coupled to" another element, it may be directly on, connected or coupled to the other element or intervening elements may be present. In contrast, when an element is referred to as being "directly on," "directly connected to" or "directly coupled to" another element or layer, there are no intervening elements or layers present. Other words used to describe the relationship between elements or layers should be interpreted in a like fashion, e.g., "between," versus "directly between," "adjacent," versus "directly adjacent," etc.

The terms used in the present specification are used for explaining a specific example embodiment, not limiting the present inventive concept. Thus, the singular expressions in the present specification include the plural expressions unless clearly specified otherwise in context. Also, terms such as "include" or "comprise" may be construed to denote a certain characteristic, number, step, operation, constituent element, or combination thereof, but may not be construed to exclude the existence of or possibility of addition of one or more other characteristics, numbers, steps, operations, constituent elements, or combinations thereof.

Unless otherwise defined, all terms including technical and scientific terms used herein have the same meaning as commonly understood by one of ordinary skill in the art to which this inventive concept pertains. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

When example embodiments are embodied in various ways, a function or operation stated in a specific block may be executed in a different way from an order stated in a flowchart. For example, two consecutive blocks may be substantially simultaneously executed and may be reversely executed according to a related function or operation.

Figure 6:
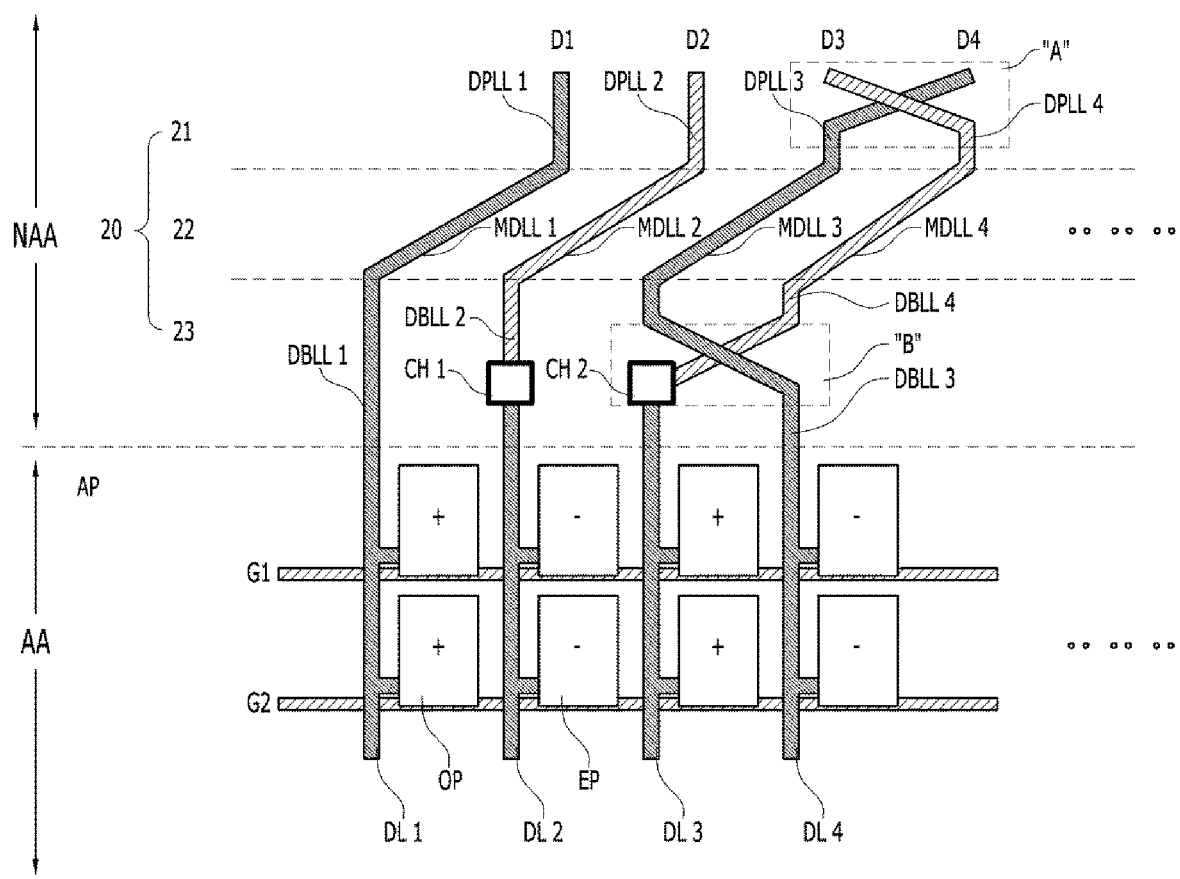
FIG. 6 is a diagram showing an example of a structure of an array substrate according to an embodiment of the present invention.

Hereinafter, the present invention will now be described more fully with reference to the accompanying drawings, in which example embodiments of the invention are shown. FIG. 6 is a diagram showing an example of a structure of an array substrate according to an embodiment of the present invention. Hereinafter, the situation in which pixel electrodes employ a column inversion method is described but this is merely an example embodiment and the present invention is not limited thereto.

The array substrate can include a plurality of gate lines G1, G2, . . . and data lines DL1, DL2, DL3, DL4, . . . that perpendicularly cross the plurality of gate lines, which are arranged in one direction to correspond to an active area of the substrate, pixel electrodes OP and EP arranged at intersections between the plurality of gate lines G1, G2, . . . and the data lines DL1, DL2, DL3, DL4, . . . , and data link lines for connection between the data lines DL1, DL2, DL3, DL4, . . . and data pads D1, D2, D3, D4, . . . corresponding thereto.

An area 20 of data link lines positioned in a non-active area can include a main data link area 22, a data pad link area 21 positioned above the main data link area 22 to connect link lines to the data pads D1, D2, D3, D4, . . . , and a data bridge link area 23 positioned below the main data link area 22 to connect data link lines to the data lines DL1, DL2, DL3, DL4, . . . , respectively.

In the main data link area 22, different metals can be sequentially and repeatedly arranged. That is, odd main data link lines MDLL1, MDLL 3, . . . can be formed of the same metal and even main data link lines MDLL2, MDLL 4, . . . can be formed of the same metal.

Data pad link lines DPLL 1, DPLL 2, DPLL 3, DPLL 4, . . . can be arranged in the data pad link area 21. Main data link lines MDLL 1, MDLL 2, MDLL 3, MDLL 4, . . . can be arranged in the main data link area 22.

Data bridge link lines DBLL 1, DBLL 2, DBLL 3, DBLL4, . . . and contact holes CH1 and CH2 can be arranged in the data bridge link area 23.

Accordingly, the area 20 of data link lines can include data pad link lines DPLLs and data link lines that are connected to the main data link lines MDLLs and the data bridge link lines DBLL.

As illustrated, according to an embodiment of the present invention, a first data link line and a third data link line can be formed of the same material and located at the same layer level, and a second data link line and a fourth data link line can be formed of the same material and located at the same layer level.

The first data link line and the third data link line can be formed of the same material and located at the same layer level as the data lines DL1, DL2, DL3, DL4, . . . .

The second data link line and the fourth data link line can be formed of different materials at different layer levels than the data lines DL1, DL2, DL3, DL4, . . . and can be connected through first and second contact holes CH1 and CH2 in the data bridge link area 23.

A second data line DL2 and a second bridge line DBLL 2 can be connected to each other through the first contact hole CH1. A third data line DL2 and a fourth data bridge line DBLL 4 can be connected to each other through the second contact hole CH2.

The data pad link area 21 and the data bridge link area 23 can each have an intersection area between data link lines formed of different metals. In the data pad link area 21, an intersection area "A" between a fourth data pad link line DPLL 4 connected to a third pad D3 and a third data pad link line DPLL 3 connected to a fourth pad D4 can be present. In the data bridge link area 23, an intersection area "B" between a fourth data bridge link line DBPLL 4 connected to a third data line DL 3 and a third data bridge link line DBLL 3 connected to a fourth data line DL4 can be present.

Although the present drawing illustrates four data lines, the array substrate can have a structure in which data lines are repeatedly arranged subsequent thereto. That is, each of the data pad link area 21 and the data bridge link area 23 can have a structure in which "first metal, second metal, second metal, first metal" are repeatedly arranged in the stated order. For example, the data pad link area 21 can have a structure with an upper portion in which "first metal, second metal, second metal, first metal" are repeatedly arranged in the stated order, and the data pad link area 21 can have a structure with a lower portion in which "first metal, second metal, first metal, second metal" are repeatedly arranged in the stated order. Also, the main data link area 22 can have a structure with an entire portion in which "first metal, second metal, first metal, second metal" are repeatedly arranged in the stated order. Further in this example, the data bridge link area 23 can have a structure with an upper portion in which "first metal, second metal, first metal, second metal" are repeatedly arranged in the stated order, and the data bridge link area 23 can have a structure with a lower portion in which "first metal, second metal, second metal, first metal" are repeatedly arranged in the stated order. In other words, two adjacent data link lines can cross each other at least twice, cross once in the data pad link area 21 and cross again in the data bridge link area 23, while two other adjacent link lines can remain separated from each other (e.g., never cross) through the non-active area, as shown in FIG. 6.

Figure 7:
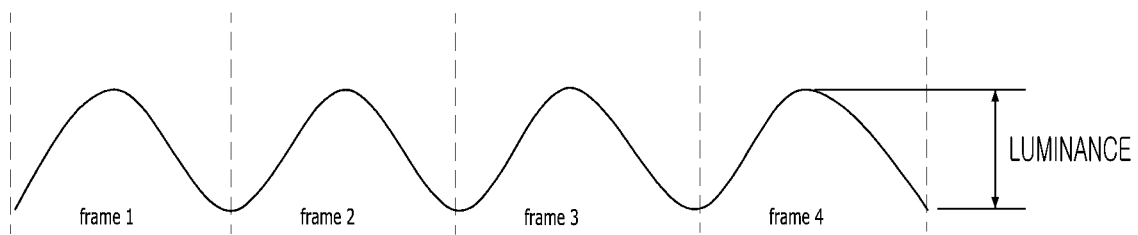
FIG. 7 is a diagram showing a luminance variation state between even and odd frames when an array substrate according to an embodiment of the present invention is used.

When the array substrate having this structure is used, a luminance variation state between frames is achieved as seen from a graph showing luminance characteristics of FIG. 7 and an experimental result of FIG. 8. In contrast to the related-art, luminance variation between odd and even frames can be reduced according to embodiments of the present invention.

As described above, a liquid crystal display device according to an embodiment of the present invention can apply a two-type metal data link structure to relieve a luminance-asymmetry phenomenon due to a characteristic difference between odd and even pixels while maintaining the characteristics of a narrow bezel, thereby preventing flicker characteristics from being degraded, e.g., as shown in FIG. 8.

The array substrate for a liquid crystal display device according to an embodiment of the present invention can have the following effects.

First, flicker characteristics can be improved using a new data link line connection structure.

Second, flicker characteristics during driving at a low frequency can be improved.

It will be apparent to those skilled in the art that various modifications and variations can be made in the present invention without departing from the spirit or scope of the inventions. Thus, it is intended that the present invention cover the modifications and variations of this invention provided they come within the scope of the appended claims and their equivalents.

What is claimed is:

1. An array substrate for a liquid crystal display device, the array substrate comprising:
   a plurality of gate lines arranged in one direction to correspond to an active area on a substrate;
   a plurality of data lines configured to cross the plurality of gate lines in a perpendicular direction with respect to the one direction;
   a plurality of pixel electrodes respectively positioned at intersections between the plurality of gate lines and the plurality of data lines; and
   a plurality of data link lines respectively connected to a $(4n-2)^{th}$ data line in the active area and a $(4n-2)^{th}$ data pad in a non-active area, and a $(4n-1)^{th}$ data line in the active area and a $(4n-1)^{th}$ data pad in the non-active area, where n is a natural number,
   wherein at least some of the plurality of data link lines are located at a different layer level than the plurality of data lines, and
   wherein two adjacent data link lines among the plurality of data link lines cross each other twice in the non-active area.

2. The array substrate of claim 1, wherein the corresponding data link lines respectively connected to each of the $(4n-2)^{th}$ data pad and the $(4n-1)^{th}$ data pad in the non-active area are formed of a different material than both of the $(4n-2)^{th}$ data line in the active area and the $(4n-1)^{th}$ data line in the active area.

3. The array substrate of claim 1, wherein a corresponding data link line electrically connected a $(4n-3)^{th}$ data pad in the non-active area and a corresponding data link line electrically connected to a $4n^{th}$ data pad in the non-active area are both formed of a same material and located at a same layer level as a $(4n-3)^{th}$ data line in the active area and a $4n^{th}$ data line in the active area.

4. The array substrate of claim 1, wherein the corresponding data link lines respectively connected to each of the $(4n-2)^{th}$ data pad in the non-active area and the $(4n-1)^{th}$ data pad in the non-active area are respectively connected to the $(4n-2)^{th}$ data line in the active area and the $(4n-1)^{th}$ data line in the active area through contact holes.

5. The array substrate of claim 1, wherein the plurality of data link lines comprise:
   a main data link area configured by sequentially and repeatedly arranging different metals;
   a data pad area adjacent to the main link area and connected to a data pad; and
   a data bridge area adjacent to the main link area and connected to a data line,
   wherein the main data link area is between the data pad area and the data bridge area.

6. The array substrate of claim 5, wherein the data pad area and the data bridge area each include wirings configured by alternately arranging two metals to cross each other at different layer levels.

7. The array substrate of claim 6, wherein a $(4n-1)^{th}$ data link line and a $4n^{th}$ data link line in the data pad area and the data bridge area are alternately configured at different layer levels.

8. The array substrate of claim 7, wherein the $(4n-1)^{th}$ data line in the active area is connected to the corresponding data link line for connection with the $(4n-1)^{th}$ data pad in the non-active area through a contact hole.

9. The array substrate of claim 1, wherein the plurality of pixel electrodes are driven by using a column inversion method.

10. An array substrate for a liquid crystal display device, the array substrate comprising:
- an active area;
- a non-active area including:
  - a data pad link area,
  - a data bridge link area, and
  - a main data link area between the data pad link area and the data bridge link area;
- a plurality of gate lines;
- a plurality of data lines crossing the plurality of gate lines;
- a plurality of pixel electrodes disposed in the active area of the array substrate, the plurality of pixel electrode being respectively positioned at intersections between the plurality of gate lines and the plurality of data lines; and
- a plurality of data link lines disposed in the non-active area of the array substrate, the plurality of data link lines being electrically connected to the plurality of data lines, respectively, wherein the plurality of data link lines include:
- a first data link line including a first data bridge link line in the data bridge link area, a first main data link line in the main data link area and a first data pad link line in the data pad link area,
- a second data link line including a second data bridge link line in the data bridge link area, a second main data link line in the main data link area and a second data pad link line in the data pad link area,
- a third data link line including a third data bridge link line in the data bridge link area, a third main data link line in the main data link area and a third data pad link line in the data pad link area, and
- a fourth data link line including a fourth data bridge link line in the data bridge link area, a fourth main data link line in the main data link area and a fourth data pad link line in the data pad link area, wherein at least two of the first, second, third and fourth data link lines are located at a different layer level than the plurality of data lines, and wherein two adjacent data link lines among the first, second, third and fourth data link lines cross each other twice in the non-active area.

11. The array substrate of claim 10, wherein the third data link line is electrically connected to a third data line among the plurality of data lines, and the fourth data link line is electrically connected to a fourth data line among the plurality of data lines,
- wherein the third data pad link line of the third data link line crosses the fourth data pad link line of the fourth data link line in the data pad link area, and
- wherein the fourth data bridge link line of the fourth data link line crosses the third data bridge link line of the third data link line in the data bridge link area.

12. The array substrate of claim 11, wherein the third data link line is located at a different layer level than the fourth data link line.

13. The array substrate of claim 12, wherein the third data link line or the fourth data link line is located at a same layer level as the plurality of data lines.

14. The array substrate of claim 12, wherein the third data link line is made of a different material than the fourth data link line.

15. The array substrate of claim 10, wherein the data pad link area has an upper portion in which a first metal, a second metal, the second metal, and the first metal are repeatedly arranged in order and respectively correspond to the first, second, third and fourth data link lines,
- wherein the data pad link area has a lower portion in which the first metal, the second metal, the first metal, and the second metal are repeatedly arranged in order and respectively correspond to the first, second, third and fourth data link lines, and
- wherein the main data link area has a structure in which the first metal, the second metal, the first metal, and the second metal are repeatedly arranged in order and respectively correspond to the first, second, third and fourth data link lines.

16. The array substrate of claim 15, wherein the data bridge link area has an upper portion in which the first metal, the second metal, the first metal, and the second metal are repeatedly arranged in order and respectively correspond to the first, second, third and fourth data link lines, and
- wherein the data bridge link area has a lower portion in which the first metal, the second metal, the second metal, and the first metal are repeatedly arranged in order and respectively correspond to the first, second, third and fourth data link lines.

17. The array substrate of claim 15, wherein the first metal is a different material than the second metal.

18. The array substrate of claim 15, wherein the first metal is located at a different layer level than the second metal.

* * * * *